United States Patent
Wallace et al.

[11] Patent Number: 6,036,748
[45] Date of Patent: Mar. 14, 2000

[54] BLACK WATER FLASH AND VAPOR RECOVERY METHOD

[75] Inventors: Paul S. Wallace, Katy; Kay A. Johnson, Missouri City; Delome D. Fair, Friendswood, all of Tex.

[73] Assignee: Texaco Inc., White Plains, N.Y.

[21] Appl. No.: 09/092,825

[22] Filed: Jun. 5, 1998

Related U.S. Application Data

[60] Provisional application No. 60/048,786, Jun. 6, 1997.

[51] Int. Cl.$^7$ .................................................. B01D 19/00
[52] U.S. Cl. .................................. 95/257; 95/258; 95/266
[58] Field of Search .......................... 95/241, 246, 277, 95/254, 256, 257, 258, 266; 96/193, 201, 155, 181, 188

[56] References Cited

U.S. PATENT DOCUMENTS

| | | | |
|---|---|---|---|
| 3,709,669 | 1/1973 | Marion et al. | 48/215 |
| 3,898,058 | 8/1975 | McGill | 95/254 |
| 3,930,931 | 1/1976 | Baughman | 159/4 ST |
| 3,966,633 | 6/1976 | Friedman | 252/373 |
| 3,972,693 | 8/1976 | Wiesner et al. | 95/250 |
| 4,011,066 | 3/1977 | Bratzler et al. | 95/251 |
| 4,052,176 | 10/1977 | Child et al. | 55/32 |
| 4,115,079 | 9/1978 | Pockrandt et al. | 95/247 |
| 4,141,695 | 2/1979 | Marion et al. | 48/197 |
| 4,141,696 | 2/1979 | Marion et al. | 48/197 |
| 4,175,929 | 11/1979 | Frumerman et al. | 48/202 |
| 4,193,776 | 3/1980 | Wasala et al. | 95/256 |
| 4,205,962 | 6/1980 | Marion et al. | 48/197 |
| 4,205,963 | 6/1980 | Marion et al. | 48/197 |
| 4,240,808 | 12/1980 | Garber et al. | 95/258 |
| 4,242,102 | 12/1980 | Snell | 48/197 |
| 4,352,680 | 10/1982 | Hackler | 95/258 |
| 4,466,810 | 8/1984 | Dille et al. | 48/197 |
| 4,471,171 | 9/1984 | Broderick | 48/62 |
| 4,526,676 | 7/1985 | Seufert | 208/58 |
| 4,578,094 | 3/1986 | Mehra | 62/17 |
| 4,588,418 | 5/1986 | Gabler et al. | 48/197 |
| 4,597,773 | 7/1986 | Quintana et al. | 48/197 |
| 4,840,648 | 6/1989 | Grunewald et al. | 95/258 |
| 4,853,002 | 8/1989 | Niedzwiecki et al. | 95/266 |
| 4,854,942 | 8/1989 | Denney et al. | 48/197 |
| 5,183,478 | 2/1993 | Holland et al. | 48/197 R |
| 5,211,002 | 5/1993 | Ruottu | 60/39 |
| 5,251,433 | 10/1993 | Wallace | 60/39.05 |
| 5,415,673 | 5/1995 | Hilton et al. | 48/197 R |
| 5,645,616 | 7/1997 | McIlroy et al. | 48/202 |
| 5,900,159 | 5/1999 | Engel et al. | 95/241 |

FOREIGN PATENT DOCUMENTS

| | | |
|---|---|---|
| 0 648 828 | 4/1995 | European Pat. Off. |
| 32 02 059 | 8/1983 | Germany |

*Primary Examiner*—Duane S. Smith
*Attorney, Agent, or Firm*—Henry H. Gibson; Arnold, White & Durkee

[57] ABSTRACT

The invention is a process of degassing and cooling a hot black water slurry. The hot black water slurry is obtained from syngas scrubbers. The black water slurry is cooled and degassed by exposing the black water slurry to a vacuum under conditions sufficient to separate dissolved gases from the black water slurry. These gases are then removed from the black water slurry. These gases can advantageously be recycled in the gasification process.

17 Claims, 1 Drawing Sheet

BLACK WATER FLASH AND VAPOR RECOVERY METHOD

CROSS REFERENCE TO PATENTS

This application claims priority from provisional patent application Ser. No. 60/048,786 filed on Jun. 6, 1997, entitled BLACK WATER FLASH AND VAPOR RECOVERY SYSTEM.

FIELD OF THE INVENTION

This invention relates generally to the cooling and degassing black water obtained from scrubbing syngas.

BACKGROUND OF THE INVENTION

Synthetic gas, or syngas, may be produced by reacting solid or liquid carbonaceous fuels with gases such as air, enriched air, or oxygen, in the optional presence of steam or water in a gasification reactor. The syngas obtained is withdrawn from the gasification reactor and subjected to several cleansing operations to rid it of various contaminants which are formed or liberated from the solid or liquid carbonaceous fuels during the gasification operation. These contaminants can readily become environmental pollutants if not properly treated during the gasification operation.

For example, materials often found in the syngas include hydrogen sulfide, ammonia, cyanides, phenols, various halogens and particulates in the form of carbon, ash, and coal, as well as trace metals. The disposal and control of these pollutants must be satisfactorily handled in order to make gasification a viable process without suffering attendant pollution problems.

As the syngas is discharged from the gasifier, it is usually subjected to multiple cooling and cleaning operations involving a scrubbing technique wherein the gas is introduced into at least one scrubber and is contacted with a water spray which cools the gas and condenses such condensables as tar, oil and organics. The water used for the scrubbing operation becomes what is commonly known as "black water," since it is contaminated with carbon. This black water can also contain soluble gases. This black water may be subjected to a variety of steps which may include the decantation of the carbon-containing solids, the partial concentration of solids in the slurry, the stripping of such gases as hydrogen sulfide, ammonia, and also solvent extraction steps to remove the carbon and dissolved carbon-containing compounds such phenols and cyanides.

Particulate solids, i.e. carbon, soot, and ash, entrained in the hot raw gas stream from a partial oxidation gas generator are removed by quench cooling the hot gas stream directly in water in a quench drum and by scrubbing with water in a gas scrubbing zone. By this means, a clean gas stream and a dispersion of particulate solids i.e. carbon and ash are produced. It is economic to reclaim the water in the aforesaid dispersion by removing particulate solids and gaseous impurities. However, in the reclaiming operation troublesome pumpable aqueous emulsions form in the system and have to be removed. The reclaimed water may be then recycled to the gas quench cooling and scrubbing zone.

Prior art utilized a flash column for reclamation of gray water. Gray water is water that has had a substantial fraction of the carbon and other solids removed. These systems are not able to remove a sufficient quantity of the noxious gases to allow open atmospheric treatment of the degassed black water.

SUMMARY OF THE INVENTION

The invention is a process of degassing and cooling a hot black water slurry. The hot black water slurry is obtained from syngas scrubbers. The black water slurry is cooled and degassed by exposing the black water slurry to a vacuum under conditions sufficient to separate dissolved gases from the black water slurry. These gases are then removed from the black water slurry. These gases can advantageously be recycled in the gasification process.

DETAILED DESCRIPTION OF THE INVENTION

As used herein, the term "vacuum" means a pressure less than the atmospheric pressure, i.e., less than about 101 KPa absolute pressure. The degree of vacuum is defined herein by the absolute pressure, i.e., a pressure of 0 KPa is a perfect vacuum.

As used herein, the term "gases" means those molecules that are in the gaseous state at the pressure and temperature conditions that exist at that point, and may include vapors that would condense at room temperature or even at higher temperatures. Water vapor is a gas, as the term is used herein.

In the partial oxidation process for producing mixtures of gases comprising hydrogen and carbon monoxide, the raw process gas stream contains entrained particulate solids, i.e. carbon and ash. The gas also contains contaminant gases, particularly carbon dioxide, ammonia, and hydrogen sulfide. The gas may also contain salts, including sodium and calcium salts. The particulate solids and a large fraction of the contaminant gases are removed by quenching or scrubbing, or both, with water. In the process of scrubbing syngas that is generated in a gasification reactor, a hot black water slurry containing particulate carbon and ash is produced, wherein the water contains carbon dioxide, hydrogen sulfide, ammonia, and possibly other gases, and may contain soluble salts, in particular calcium salts.

Sulfides including hydrogen sulfide may be rendered solid by addition of ferrous salts, i.e., ferrous sulfate, and treated thereafter as a solid in the black water. Alternatively, sulfides may be treated as a volatile gas.

The hot black water slurry contains from about 0.3 to about 10% by weight suspended solids. The hot black water slurry is usually from about 150 degrees Centigrade to about 300 degrees Centigrade, though the temperature is not critical.

This black water slurry is flashed into a vacuum to remove dissolved gases, volatiles, and water vapor. Flashing into a vacuum involves exposing the hot black water slurry to a vacuum under conditions where gases and vapors can evolve, or leave, the hot black water slurry. Generally, agitation or significant gas liquid contact, as is obtained by plates in a flash tower or by introducing the liquid from a port above the gas liquid contact is sufficient. The flashed gases, which includes vapors such as water vapor, are then separated by gravity from the slurry in a quiet region of the vacuum drum, and the gases exit the drum above while the cooled degassed slurry exits the drum below.

Said flashing also necessarily removes water vapor, thereby cooling the gas stream. The amount of cooling depends on the amount of vacuum generated and the quantity of water vapor removed. For a pressure of about 52 KPa, the slurry should cool to about 82 degrees Centigrade.

The greater the vacuum, the more complete the removal of the gases and vapors. However, the black water slurry contains gases that were dissolved therein at high pressure, i.e., often at pressures of 15000 KPa absolute pressure or more. Therefore, a pressure from about 50 to about 100 KPa absolute pressure will in general remove most of the dissolved gases. A pressure from about 35 to about 50 KPa absolute pressure will in general remove more of the dissolved gases, and a vacuum from about 10 to about 35 KPa absolute pressure will remove essentially all of the dissolved gases.

In a process wherein there is sufficient gas-water contact and a vacuum of between about 35 to about 75 KPa absolute pressure is maintained, the resulting black water slurry may contain less than about 10 parts per million by weight of hydrogen sulfide and less than about 10 parts per million by weight of free, i.e., not ionically bound to an acid, ammonia. In a process wherein there is sufficient gas-water contact and a vacuum of between about 10 to about 35 KPa absolute pressure is maintained, the resulting black water slurry may contain less than about 1 part per million by weight of hydrogen sulfide and less than about 1 part per million by weight of free ammonia. Of course, it is possible to achieve greater vacuum, i.e., 5 KPa, but the costs of achieving said vacuum can not normally be justified in the quantity of extra gases removed.

On flashing, the black water slurry is cooled. Black water can not be readily cooled by conventional heat exchangers, as the surfaces would foul with solids and calcium salts. There is no cooling surface in the present invention, such as would be found in a heat exchanger, for solids and calcium salts to foul. The cooled and degassed black water slurry can be further treated at atmospheric conditions to separate solids from the water. The low level of otherwise hazardous gases, particularly hydrogen sulfide, in the black water does not pose a safety hazard.

The vacuum drum is designed to handle this slurry, with its abrasive solids. The bottom of the vacuum drum and the connecting piping are inclined at angles sufficient to prevent solids buildup, i.e., not less than about 10 degrees from horizontal. The hot black water slurry inlet to the vacuum drum is flush with the inner wall to prevent nozzle erosion.

It is often advantageous to condense the water vapor for recycling to syngas scrubbers. A condenser, or an heat exchanger and a liquid knockout vessel, can be used to condense water vapor. It is preferred that the condensation be done under vacuum to minimize the quantity of ammonia, carbon dioxide, and hydrogen sulfide that dissolve in the condensed water. A short residence time in the condenser will also help minimize the quantity of gases that dissolve in the condensed water. The condenser preferably cools the gas to below about 40 degrees Centigrade.

The cooled gas exiting the water vapor condenser contains absorbing ammonia, carbon dioxide, and hydrogen sulfide, as well as carbon monoxide and hydrogen and inerts such as nitrogen. It is advantageous to absorb the ammonia, carbon dioxide, and hydrogen sulfide in cooled basic water. Basic water can contain either a base such as sodium hydroxide or be an ammonia rich water. It is preferred that the pH of the water be above 9, preferrably above 11, more preferably above 12. The absorbing water and the gas are brought in intimate contact in a gas scrubbing unit. The gas scrubbing unit can be any type, including a jet scrubber, a tray or packed column, a venturi, or other gas scrubbers used in industry. A counter current gas scrubbing tower with packing is preferred. Temperature control is important, and the caustic or ammonia rich water withdrawn from the bottom of the tower should pass through a heat exchanger to cool the fluid before circulating the fluid back to the top of the tower. The preferred temperature of the caustic water is between about 0 and about 40 degrees Centigrade, preferably between about 5 and about 30 degrees Centigrade.

Because the absorption of these gases is temperature dependent, it is preferred that the ammonia, carbon dioxide, and hydrogen sulfide are absorbed in the cooled caustic or ammonia rich water while still under a vacuum. It is possible, especially if the vacuum pump is mechanical, to let these gases pass through the vacuum pump and absorb these gases at atmospheric pressure or even at elevated pressures.

The method of generating a vacuum is not important. Conventional means include jet orifices and mechanical pumps.

The caustic or ammonia rich water is advantageously recycled to the gasification reactor. There, these gases help moderate the pH of the gasification reactor by neutralizing some organic acids, particularly formic acid.

Figure 1:
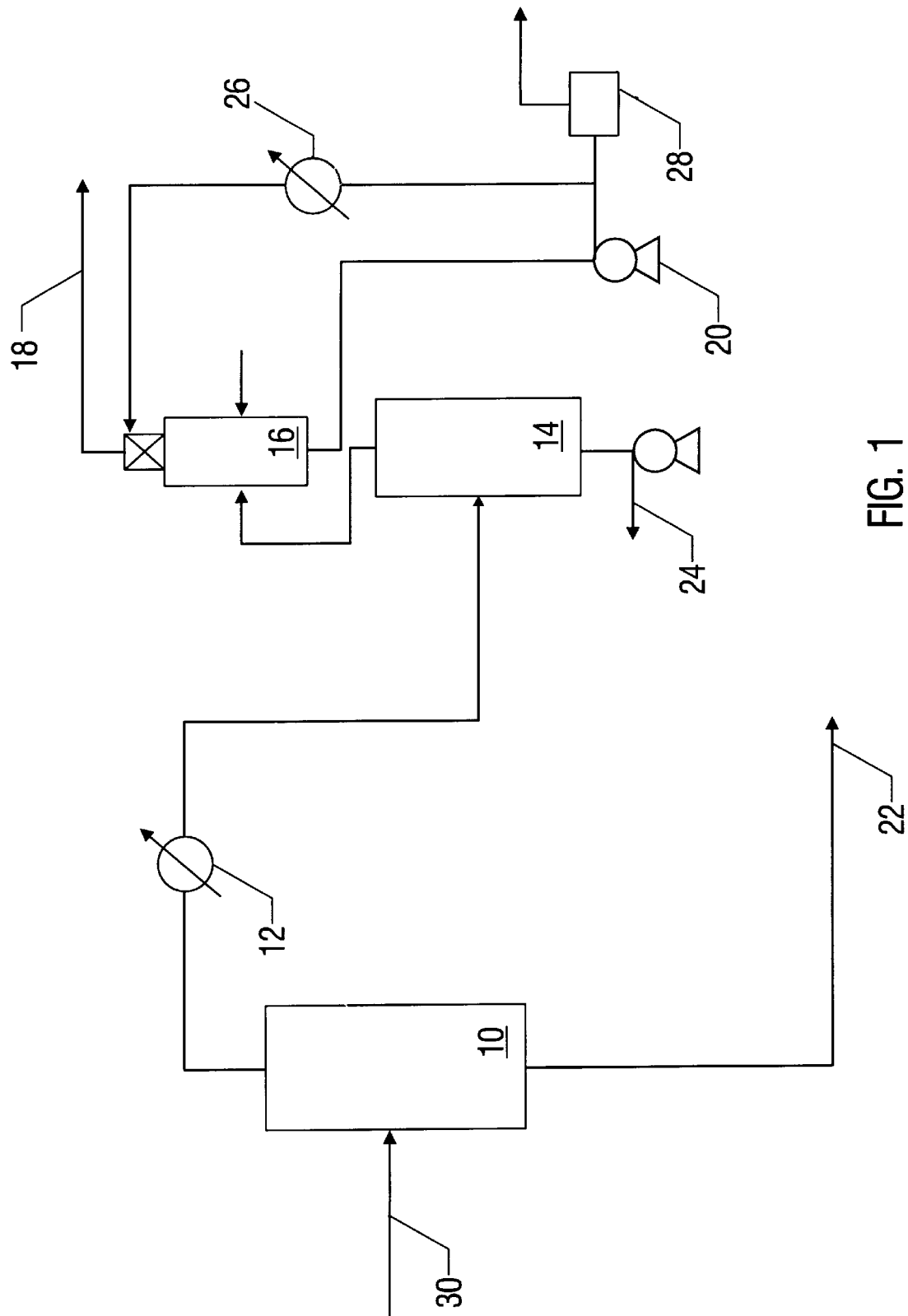
FIG. 1 is a schematic of the process. Raw hot black water inters from the gas scrubbing vessels (not shown) via conducting pipe (30) into the vacuum flash drum (10). the black water flashes in this vacuum, liberating dissolved gases and vapors, and cooling the black water. The black water is withdrawn from the vacuum flash drum (10) through conducting pipe 22 to further treatment facilities (not shown). The gases and vapors exit the vacuum flash drum (10) and pass through a condenser, depicted here as a heat exchanger (12) and a liquid knockout vessel (14). The condensed water vapor is passes though a pump (24) to the gas scrubbing vessels (not shown). Gases exit the liquid knockout vessel (14) and enter the absorber (16). Caustic ammonia laden water is withdrawn from the bottom of the absorber (16) through a circulation pump (20). A fraction of the water exiting this circulation pump (20) is routed to the gasifier through the high pressure pump (28). A fraction of the of the water exiting this circulation pump (20) is routed though a cooler (26) and back to the top of the absorber. Fresh caustic water is added as needed. The remaining gases, which include hydrogen, carbon monoxide, and inerts such as nitrogen, are routed via conducting pipe (18) through the vacuum generator (not shown) to a flare (not shown).

What is claimed is:

1. A process of degassing and cooling a black water slurry obtained from syngas scrubbers by exposing the black water slurry to a vacuum under conditions sufficient to separate dissolved gases from the black water slurry, wherein the black water slurry prior to exposure to the vacuum is between about 150° C. and about 300° C., and removing the gases from the black water slurry.

2. The process of claim 1 further comprising conveying the gases to a condenser and condensing the water vapor.

3. The process of claim 2 further comprising conveying the condensed water to a syngas scrubber.

4. The process of claim 1 further comprising exposing the gases to cooled basic water under conditions sufficient to absorb ammonia, carbon dioxide, and hydrogen sulfide.

5. The process of claim 4 wherein the step of absorbing ammonia, carbon dioxide, and hydrogen sulfide in cooled caustic or ammonia rich water occurs at a vacuum.

6. The process of claim 4 wherein the step of absorbing ammonia, carbon dioxide, and hydrogen sulfide in cooled caustic or ammonia rich water occurs at a pressure greater than or equal to 101 KPa pressure.

7. The process of claim 3 further comprising the step of recycling the caustic or ammonia rich water to the gasification reactor.

8. The process of claim 1 further comprising the step of further treating the black water at atmospheric conditions to separate solids from the water.

9. The process of claim 1 wherein the pressure is from about 10 to about 75 KPa absolute pressure.

10. The process of claim 1 wherein the pressure is from about 10 to about 50 KPa absolute pressure.

11. The process of claim 1 wherein the pressure is from about 35 to about 50 KPa absolute pressure.

12. The process of claim 1 wherein the pressure is from about 10 to about 35 KPa absolute pressure.

13. The process of claim 1 wherein the resulting black water slurry contains less than about 10 parts per million by weight of hydrogen sulfide and less than about 10 parts per million by weight of free ammonia.

14. The process of claim 1 wherein the resulting black water slurry contains less than about 1 part per million by weight of hydrogen sulfide and less than about 1 part per million by weight of free ammonia.

15. The process of claim 2, wherein the black water slurry is exposed to the vacuum in a vacuum flash drum, further comprising conveying the gas from the condensor to an absorber, and therein contacting the gas to basic water under conditions sufficient to absorb ammonia, carbon dioxide, and hydrogen sulfide from the gas, and then conveying the gas from the absorber to a vacuum generator.

16. The process of claim 15 wherein the bottom of the vacuum flash drum is inclined at an angle not less than 10 degrees from horizontal, and wherein the black water slurry is withdrawn from the vacuum flash drum via piping, wherein the pipe is inclined at an angle not less than 10 degrees from horizontal.

17. The process of claim 16 wherein the black water is introduced to the vacuum flash drum via piping, wherein the inlet is flush with the inner wall to prevent nozzle erosion.

* * * * *